(12) United States Patent
Lee et al.

(10) Patent No.: US 7,543,945 B2
(45) Date of Patent: Jun. 9, 2009

(54) INTEGRATOR MODULE WITH A COLLIMATOR AND A COMPACT LIGHT SOURCE AND PROJECTION DISPLAY HAVING THE SAME

(75) Inventors: Young-chol Lee, Suwon-si (KR); Dong-ha Kim, Suwon-si (KR); Yasunori Kuratomi, Seongnam-si (KR); Il-kweon Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1156 days.

(21) Appl. No.: 10/819,152

(22) Filed: Apr. 7, 2004

(65) Prior Publication Data
US 2005/0063184 A1  Mar. 24, 2005

(30) Foreign Application Priority Data
Sep. 17, 2003  (KR)  ............... 10-2003-0064581

(51) Int. Cl.
*G03B 21/14* (2006.01)
*G03B 21/28* (2006.01)
*G03B 21/26* (2006.01)
*G01D 11/28* (2006.01)
*F21V 9/14* (2006.01)
*H01J 5/16* (2006.01)

(52) U.S. Cl. .............. 353/99; 353/20; 353/94; 362/26; 362/19; 362/582; 313/112; 385/132; 385/146

(58) Field of Classification Search .......... 353/20, 353/99, 94, 98; 362/26, 19, 582, 551; 313/372, 313/112, 475; 385/132, 146
See application file for complete search history.

(56) References Cited

U.S. PATENT DOCUMENTS

| 6,318,863 | B1 * | 11/2001 | Tiao et al. | 353/31 |
| 6,948,836 | B2 * | 9/2005 | Ishida et al. | 362/516 |
| 7,040,767 | B2 * | 5/2006 | Lee et al. | 353/99 |
| 7,097,334 | B2 * | 8/2006 | Ishida et al. | 362/516 |

FOREIGN PATENT DOCUMENTS

JP  2001042431  2/2001

* cited by examiner

*Primary Examiner*—Diane I Lee
*Assistant Examiner*—Magda Cruz
(74) *Attorney, Agent, or Firm*—Stanzione & Kim, LLP

(57) ABSTRACT

A projection display includes three illumination units to emit red, green, and blue beams, at least one optical modulator to modulate the red, green, and blue beams to be suitable for image data, and projection optics to magnify and project the light beams emitted from the at least one optical modulator. Each of the illumination units includes: a collimator including a parabolic first reflective surface; a compact light source located at a focal point of the first reflective surface; a polarizer that transforms a light beam emitted from the collimator into a P- or S-polarized beam; and an integrator that transforms the light beam emitted from the polarizer to be emitted at a uniform intensity of light.

26 Claims, 11 Drawing Sheets

INTEGRATOR MODULE WITH A COLLIMATOR AND A COMPACT LIGHT SOURCE AND PROJECTION DISPLAY HAVING THE SAME

CROSS-REFERENCE TO RELATED APPLICATIONS

This application claims the priority of Korean Patent Application No. 2003-64581, filed on Sep. 17, 2003, in the Korean Intellectual Property Office, the disclosure of which is incorporated herein in its entirety by reference.

BACKGROUND OF THE INVENTION

1. Field of the Invention

The present invention relates to a projection display, and more particularly, to a projection display adopting a compact light source such as a light emitting diode.

2. Description of the Related Art

FIG. 1 shows the structure of a conventional projection display. Referring to FIG. 1, the conventional projection display includes liquid crystal display (LCD) panels 20R, 20G, and 20B which are optical modulators, an illumination unit 10 which irradiates light onto the LCD panels 20R, 20G and 20B, and a projection lens 40 which magnifies and projects a modulated image.

The LCD panels 20R, 20G, and 20B modulate red (R), green (G), and blue (B) beams, respectively, according to respective image data so as to display a color image. Reference numeral 30 denotes a synthesizing prism which combines the modulated R, G, and B beams into one beam and then irradiates the combined beam onto the projection lens 40.

The illumination unit 10 includes a light source 1, an integrator 3, a condenser lens 4, a plurality of mirrors 5R, 5G, and 5B, and a plurality of relay lenses 7 and 8.

The light source 1 may be a metal halide lamp or a super-high voltage mercury lamp, and is located at a focal point of a reflective mirror 2 with a parabolic surface. The integrator 3 is used to irradiate a uniform beam onto the LCD panels 20R, 20G and 20B and is generally made of two fly-eye lenses in which micro-lenses are two-dimensionally arrayed. A light beam, which has passed through the integrator 3, is condensed by the condenser lens 4. The mirrors 5R, 5G, and 5B are selective reflector mirrors which reflect the R, G and B beams, respectively, and transmit other color beams. A light beam is split into the R, G, and B beams via the mirrors 5R, 5G, and 5B, respectively, and then the R, G, and B beams are incident on the LCD panels 20R, 20G, and 20B, respectively, through the relay lenses 7 and 8. The LCD panels 20R, 20G, and 20B modulate the R, G, and B beams, respectively, so as to output R, G, and B color images. The synthesizing (chroic) prism 30 combines the R, G, and B beams output from the LCD panels 20R, 20G, and 20B into one beam, and then the projection lens 40 magnifies and projects the combined beam.

However, in such a conventional projection display, a lamp is used as a light source to illuminate optical modulators and has a short life span. Therefore, when the conventional projection display is used in homes, the lamp should be frequently replaced with a new one. Also, the light source is large in size. In order to solve these problems, studies on the use of compact light sources, such as a light emitting diode (LED) with a relatively long life span, etc., are in progress. Japanese Patent Publication No. JP 2001-42431 discloses a projection device using an LED.

In order to increase an amount of light to be effectively projected by the projection lens 40, the conventional projection display requires secondary optics to collimate a light beam radiating from the LED before irradiating the light beam onto the optical modulators. As a result, the additional use of the secondary optics makes an illumination system of the conventional projection display complicated, and increases costs of manufacturing the illumination system. In general, an LED emits a smaller amount of light than a metal halide lamp or a super-high voltage mercury lamp. Thus, the conventional projection display uses an array of LEDs as a light source. In this case, secondary optics is necessary. However, since the secondary optics has to be lenses, light condensing efficiency deteriorates.

SUMMARY OF THE INVENTION

The present invention provides a projection display which can be made compact and can have a long life span by adopting a compact LED.

Additional aspects and advantages of the invention will be set forth in part in the description which follows and, in part, will be obvious from the description, or may be learned by practice of the invention.

The foregoing and/or other aspects of the present invention are achieved by providing a projection display including three illumination units to emit red, green, and blue beams, at least one optical modulator to modulate the red, green, and blue beams according to image data, and projection optics to magnify and project the light beams emitted from the at least one optical modulator. Each of the illumination units includes: a collimator including a parabolic first reflective surface; a compact light source located at a focal point of the first reflective surface; a polarizer that transforms a light beam emitted from the collimator into a P- or S-polarized beam; and an integrator that transforms the light beam emitted from the polarizer to be emitted at a uniform intensity of light.

As an aspect of the invention, the compact light source may be arrayed so that its optical axis is perpendicular to a principal axis of the first reflective surface.

As another aspect of the invention, the collimator may further include a second reflective surface which faces the first reflective surface and which includes an optical window through which a light beam radiates from the compact light source. The second reflective surface may incline with respect to the principal axis of the first reflective surface at a predetermined incidence angle and the compact light source may be arrayed so that its optical axis inclines with respect to the principal axis at the same incidence angle as the predetermined incidence angle of the second reflective surface. The collimator may further include a third reflective surface which is slantingly formed at the edge of the optical window and reflects a light beam radiating at a smaller angle than an aperture angle toward the first reflective surface.

As another aspect of the invention, the integrator includes a rectangular parallelepiped glass rod or a rectangular parallelepiped light tunnel with an inner reflective surface.

As another aspect of the invention, the polarizer may include: a polarizing beam splitter that transmits one of P and S waves and reflects the other one; and a λ/2 plate that transforms one of the transmitted and reflected wave beams so as to have a different polarization orientation.

As yet another aspect of the invention, the optical modulator is a reflective optical modulator which sequentially modulates the red, green, and blue beams emitted from the three illumination units. Here, a λ/4 plate and a polarizing beam splitter are sequentially installed in front of the reflective optical modulator, the polarizing beam splitter and the λ/4 plate transmitting the red, green, and blue beams radiating from the illumination units, the reflective optical modulator modulating the red, green, and blue beams, the λ/4 plate re-transmitting the red, green, and blue beams, and the polarizing beam splitter reflecting the red, green, and blue beams toward the projection optics.

The projection display may further include: three transmittable optical modulators that modulate the red, green, and blue beams radiating from the illumination units, respectively; and a synthesizing prism that combines the red, green, and blue beams emitted from the transmittable optical modulators into a combined beam and irradiates the combined beam on the projection optics.

The foregoing and/or other aspects of the present invention are also achieved by providing a projection display including three illumination units to emit red, green, and blue beams, an optical modulator to modulate the red, green, and blue beams according to image data, and projection optics to magnify and project the light beams emitted from the optical modulator. Each of the illumination units includes: a collimator that includes a parabolic first reflective surface and a second reflective surface which faces the first reflective surface and which includes an optical window through which light beams radiate in the vicinity of a focal point of the first reflective surface; a compact light source located at a focal point of the first reflective surface; a polarizer that transforms a light beam emitted from the collimator into a P-polarized or S-polarized beam; and a rectangular parallelepiped glass rod that transforms the light beam emitted from the polarizer to be emitted at a uniform intensity of light.

The foregoing and/or other aspects of the present invention are also achieved by providing an illumination unit having a light source and to be used with a projection display, comprising: a collimator comprising a parabolic first reflective surface; a compact light source located at a focal point of the first reflective surface; a polarizer that transforms a light beam emitted from the collimator into a P or S polarized beam; and an integrator that transforms a light beam emitted from the polarizer to be emitted at a uniform intensity of light.

BRIEF DESCRIPTION OF THE DRAWINGS

These and/or other aspects and advantages of the present invention will become apparent and more readily appreciated from the following description of the embodiments, taken in conjunction with the accompanying drawings of which.

DETAILED DESCRIPTION OF THE INVENTION

Figure 1:
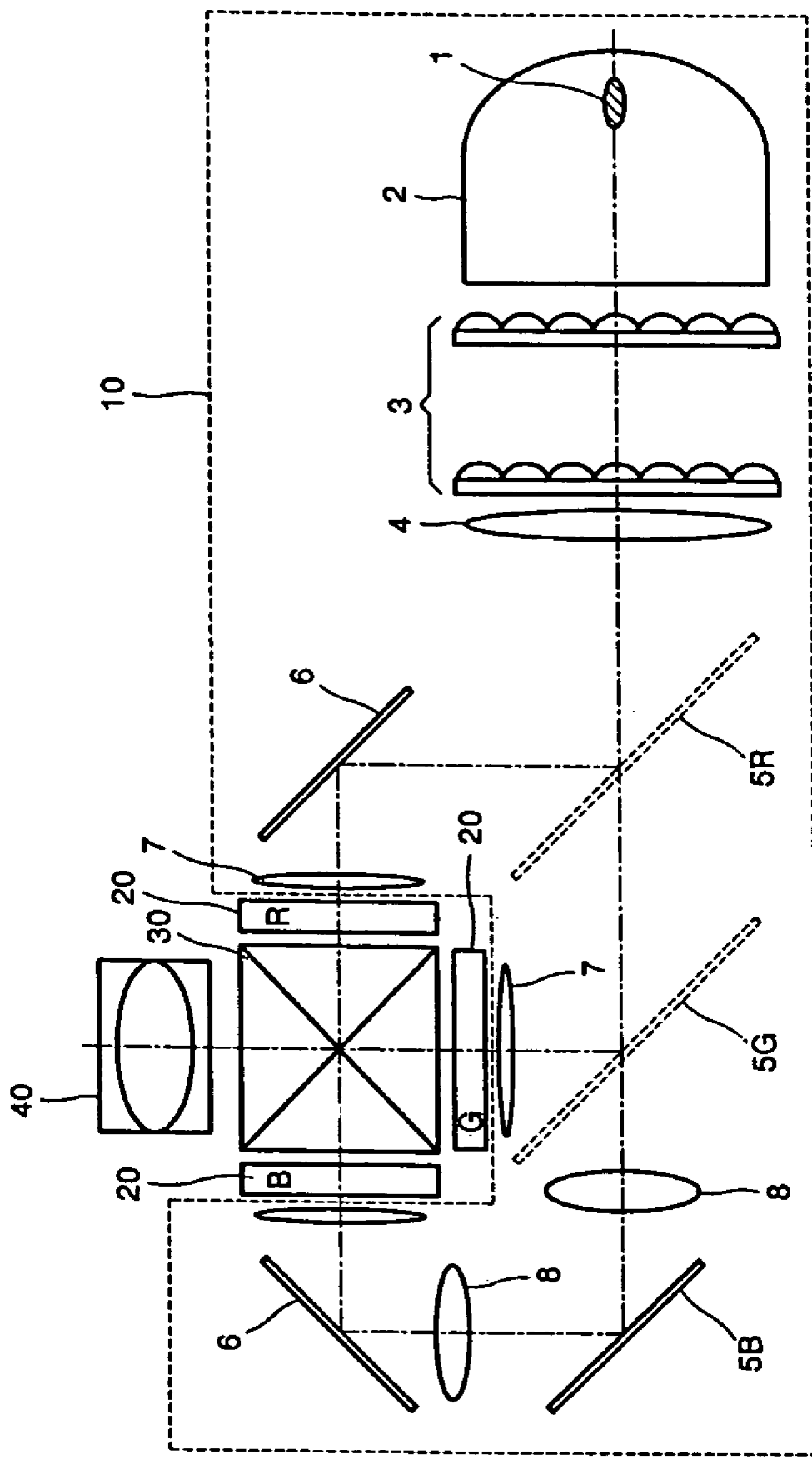
FIG. 1 is a view showing the structure of a conventional projection display.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 2:
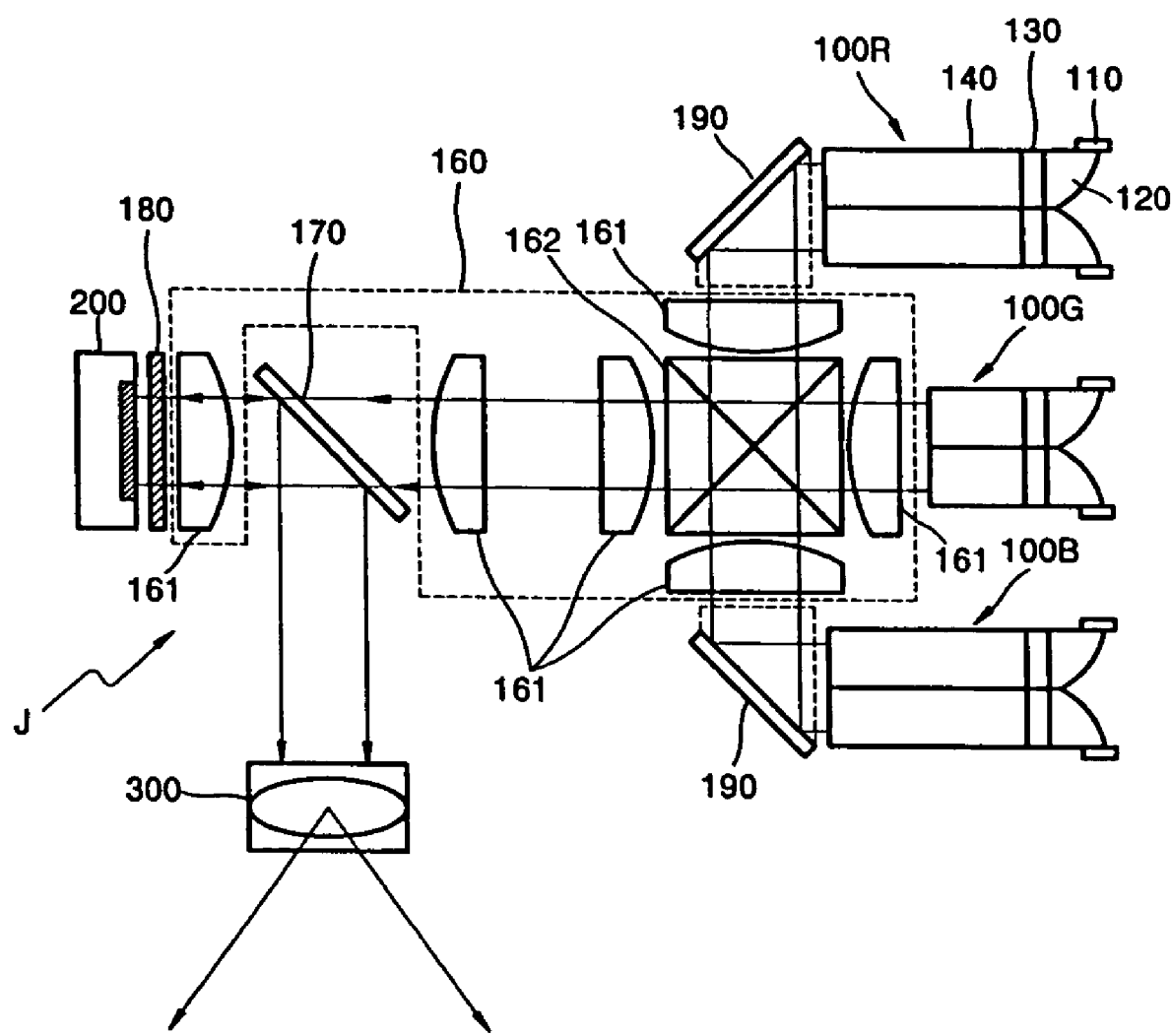
FIG. 2 is a view showing the structure of a projection display, according to an embodiment of the present invention.

FIG. 2 is a view showing the structure of a projection display, according to an embodiment of the present invention. Referring to FIG. 2, the projection display includes illumination units 100R, 100G, and 100B, an optical modulator 200, and projection optics 300. The optical modulator 200 modulates light beams radiating from the illumination units 100R, 100G, and 100B according to image data, and then emits the modulated light beams. In the present embodiment, the optical modulator 200 is a reflective optical modulator. The reflective optical modulator may be a digital micro-mirror device (DMD), a reflective type LCD panel, a liquid crystal on silicon (LCOS) panel, or the like. The projection optics 300 magnifies and projects the modulated light beam. The illumination units 100R, 100G, and 100B emit R, G, and B beams, respectively, which have been transformed to be at a uniform intensity of light. Reference numeral 160 denotes relay optics which allow the R, G and B beams, emitted from the illumination units 100R, 100G, and 100B, to be incident on the optical modulator 200. Reference numerals 170 and 180 denote a polarizing beam splitter (PBS) and a λ/4 plate, respectively.

Figure 3:
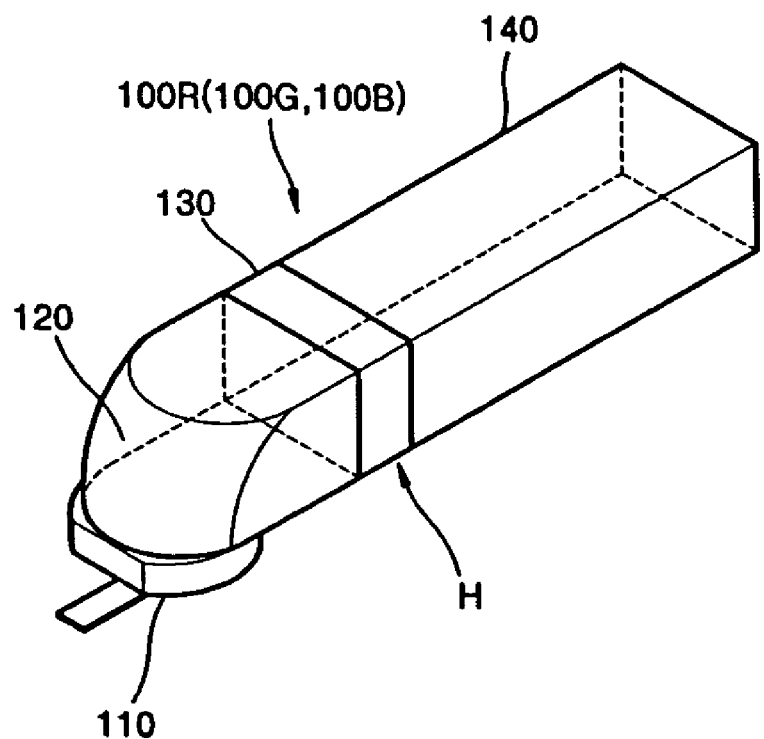
FIG. 3 is a perspective view of an illumination unit used with a projection display, according to an embodiment of the present invention.

FIG. 3 is a perspective view of the illumination unit 100R (100G and 100B) of FIG. 2. Referring to FIG. 3, the illumination unit 100R (100G and 100B) includes a compact light source 110, a collimator 120, a polarizer 130, and an integrator 140.

The compact light source 110 may be a light emitting diode (LED), an organic electro luminescent (EL) device, a laser diode, or the like. The compact light sources 110 of the illumination unit 100R, 100G, and 100B emit the R, G, and B beams, respectively.

Figure 4:
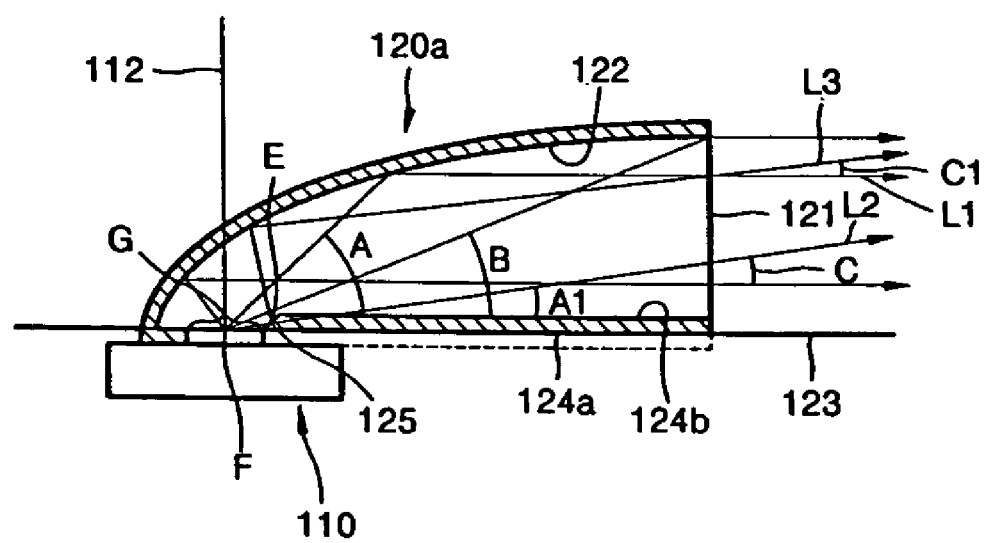
FIGS. 4 through 8 are cross-sectional views of collimators used with a projection display, according to five different embodiments of the present invention, respectively.

FIG. 4 is a cross-sectional view of a collimator, according to an embodiment of the present invention. Referring to FIGS. 3 and 4, a collimator 120a has a side aperture 121. The collimator 120a collimates a light beam radiating from the light source 110 to emit the light beam through the side aperture 121. The collimator 120a includes a first reflective surface 122 which reflects light beams. The first reflective surface 122 is parabolic. The compact light source 110 is arrayed so that its radiation point is located in the vicinity of a focal point F of the first reflective surface 122. As shown in FIG. 4, the compact light source 110 may be arrayed so that its optical axis 112 is nearly perpendicular to the principal axis 123.

The collimator 120a may further include a second reflective surface 124a. The second reflective surface 124a is plane, located under the first reflective surface 122, and includes an optical window G through which a light beam radiates. For example, the second reflective surface 124*a* may be a plane including the principal axis 123 and the focal point F.

The collimator 120*a* may further include a third reflective surface 125. The third reflective surface 125 is slantingly formed at the edge of the optical window G. In this case, the second reflective surface is slightly stepped from the plane including the principal axis 123 toward the first respective surface 122, as indicated by reference numeral 124*b*.

As described above, the first reflective surface 122 is defined to have a parabolic shape. The term "parabolic" denotes not only a strict parabolic shape whose conic coefficient K is 1 but also an aspherical shape whose conic coefficient K is in the range of −0.4 to −2.5, preferably, −0.7 to −1.6. The conic coefficient K for the first reflective surface 122 can be adequately determined as any value in the aforementioned range so that light emitted from a compact light source is collimated to have a radiation angle range that enables the light to effectively illuminate an optical modulator. An example where the first reflective surface 122 has a strict parabolic shape whose K is 1 will now be described.

A light beam radiating from the compact light source 110 at a radiation angle A between 0° and 180° is incident on the first reflective surface 122. In the present embodiment, the radiation angle A is defined counterclockwise from the principal axis 123. A light beam L1 radiates from the compact light source 110 in the vicinity of the focal point F at a greater radiation angle A than an aperture angle B, is reflected from the parabolic first reflective surface 122 to be parallel with the principal axis 123, and is emitted through the side aperture 121. In a case where the collimator 120*a* does not include the third reflective surface 125, a light beam L2 radiates from the compact light source 110 at a smaller radiation angle A1 than the aperture angle B and is not incident on the first reflective surface 122, but is directly emitted through the side aperture 121. Therefore, the light beam L2 is emitted at an emission angle C between 0° and the aperture angle B. In other words, the collimator 120*a* collimates a light beam radiating from the compact light source 110 at the radiation angle A between 0° and 180° to be emitted at the emission angle C between 0° and the aperture angle B.

It has been described that the compact light source 110 appears to be a point light source with a radiation point through which all light beams radiate from the focal point F. However, the compact light source 110 is not exactly a point light source, but is a surface light source with a predetermined radiation area. Thus, light beams radiating from the compact light source 110 may be regarded as radiating in the vicinity of the focal point F. To be more specific, a portion of light beams radiating from the compact light source 110 may be reflected from the first reflective surface 122 toward the second reflective surface 124*a* or 124*b*, and not toward the side aperture 121. Therefore, the second reflective surface 124*a* or 124*b* serves to reflect such light beams toward the side aperture 121 so as to improve light efficiency.

A light beam L3 radiates from the compact light source 110 at a smaller radiation angle A1 than the aperture angle B, and then is reflected from the third reflective surface 125 toward the first reflective surface 122. Although the light beam L3 radiates in the vicinity of the focal point F of the first reflective surface 122, the light beam L3 is reflected from the third reflective surface 125 toward the first reflective surface 122. Thus, the light beam L3 may be seen as radiating from point E intersecting the third reflective surface 125. Therefore, the light beam L3 is reflected from the third reflective surface 125 not to be parallel with the principal axis 123. However, the light beam L3 is emitted at least at a smaller emission angle C1 than the initial radiation angle A1. As a result, the third reflective surface 125 can contribute to improving light collimating efficiency.

Figure 5:
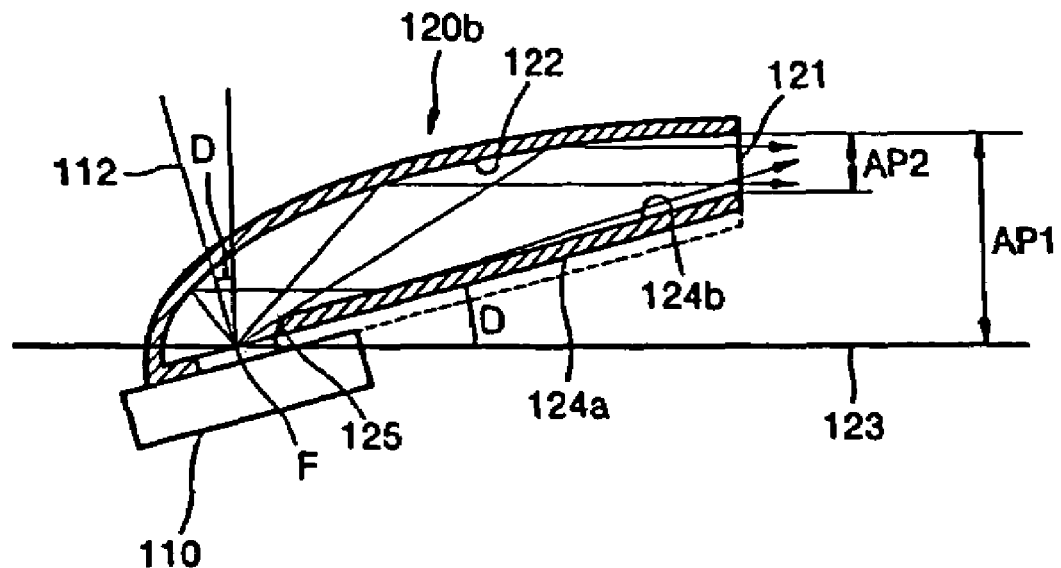

FIG. 5 is a cross-sectional view of a collimator, according to another embodiment of the present invention. Referring to FIG. 5, the second reflective surface 124*a* or 124*b* inclines with respect to the principal axis 123 of the first reflective surface 122 at an angle D. The compact light source 110 is arrayed so that its optical axis 112 is nearly perpendicular to the second reflective surface 124*a* or 124*b*. As a result, the optical axis 112 of the compact light source 110 inclines with respect to the principal axis 123 of the first reflective surface 122 at the angle D. This structure can contribute to reducing the size of an aperture of a collimator 120*b*. Reference character AP2 denotes the size of the aperture of the collimator 120*b*. Reference character AP1 denotes the size of an aperture of the collimator 120*a* of FIG. 4 in which the second reflective surface 124*a* or 124*b* is parallel with the principal axis 123. As can be seen in FIG. 5, it is obvious that the size AP2 of the aperture of the collimator 120*b* is smaller than the size AP1 of the aperture of the collimator 120*a*. Accordingly, the reduction in the size of the aperture is advantageous in arraying a plurality of collimators.

Figure 6:
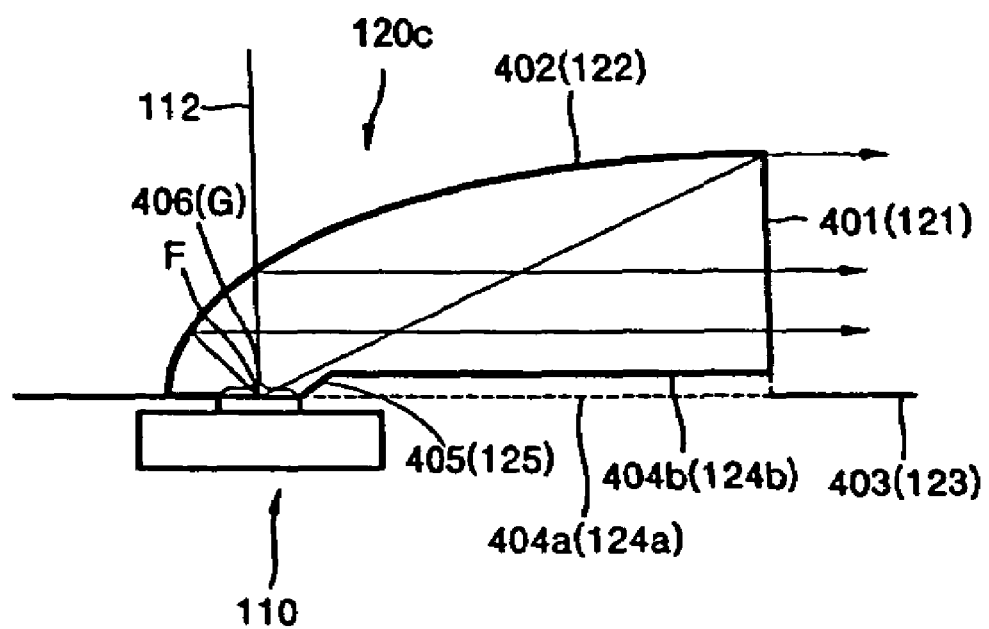
Figure 7:
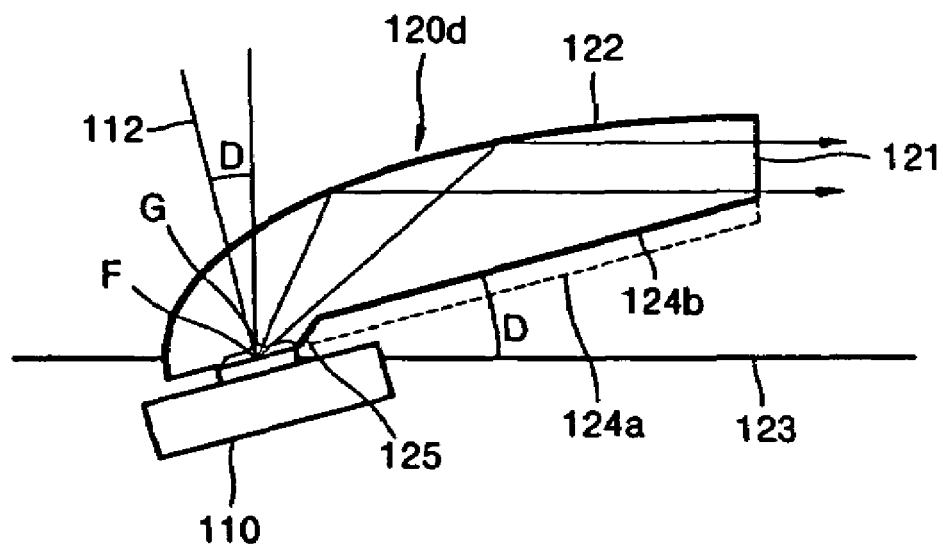

FIGS. 6 and 7 are cross-sectional views of collimators, according to different embodiments of the present invention. The collimators of the present embodiments (FIGS. 6 and 7) are characterized in that they are formed of a transparent body.

Referring to FIG. 6, a transparent body 120*c* includes a parabolic outer surface 402, plane lower surfaces 404*a* and 404*b*, and a side surface 401. The outer surface 402 is coated with a reflective material so as to reflect a light beam radiating from the compact light source 110. Thus, the outer surface 402 serves as the first reflective surface 122. The lower surfaces 404*a* and 404*b* are coated with a reflective material, except an area 406 through which light beams radiate from the compact light source 110. Thus, the lower surfaces 404*a* and 404*b* serve as the second reflective surface 124*a* or 124*b*. An incline plane 405 is formed at the edge of the area 406 and is coated with a reflective material. The incline plane 405 serves as the third reflective surface 125 and is also referred to as an optical window G. Thus, according to this structure, the transparent body 120*c* serves as the collimator 120*a* of FIG. 4.

Referring to FIG. 7, a collimator 120*d* is the same as the collimator 120*b* of FIG. 5 except that the collimator 120*d* is formed of a transparent body. The same reference numerals as those of FIG. 5 refer to the like elements. Thus, repeated descriptions will be omitted.

Figure 8:
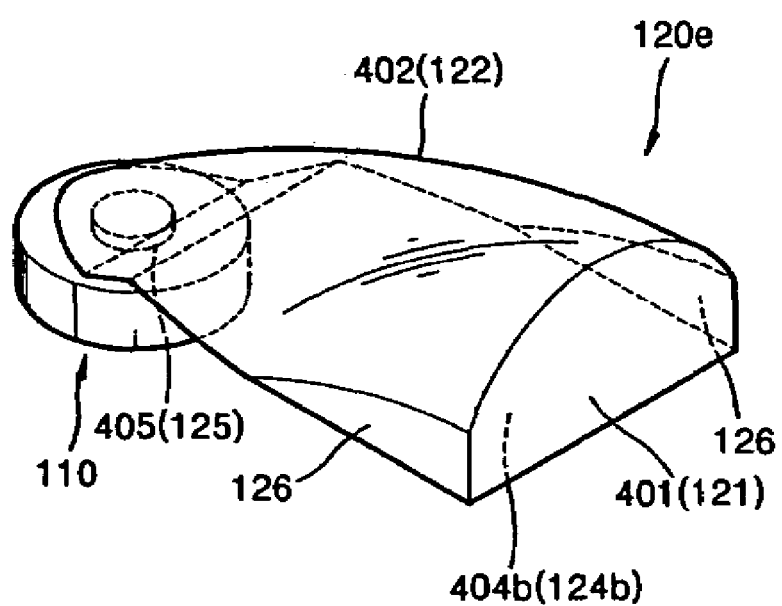

As shown in FIG. 8, plane adherent surfaces 126 may be formed on both sides of the outer surface 402. According to a collimator 120*e* having the structure of FIG. 8, nearly rectangular illumination light can be obtained. The adherent surfaces 126 are applicable to the collimators 120*a*, 120*b*, and 120*d* shown in FIGS. 4, 5, and 7.

Figure 9:
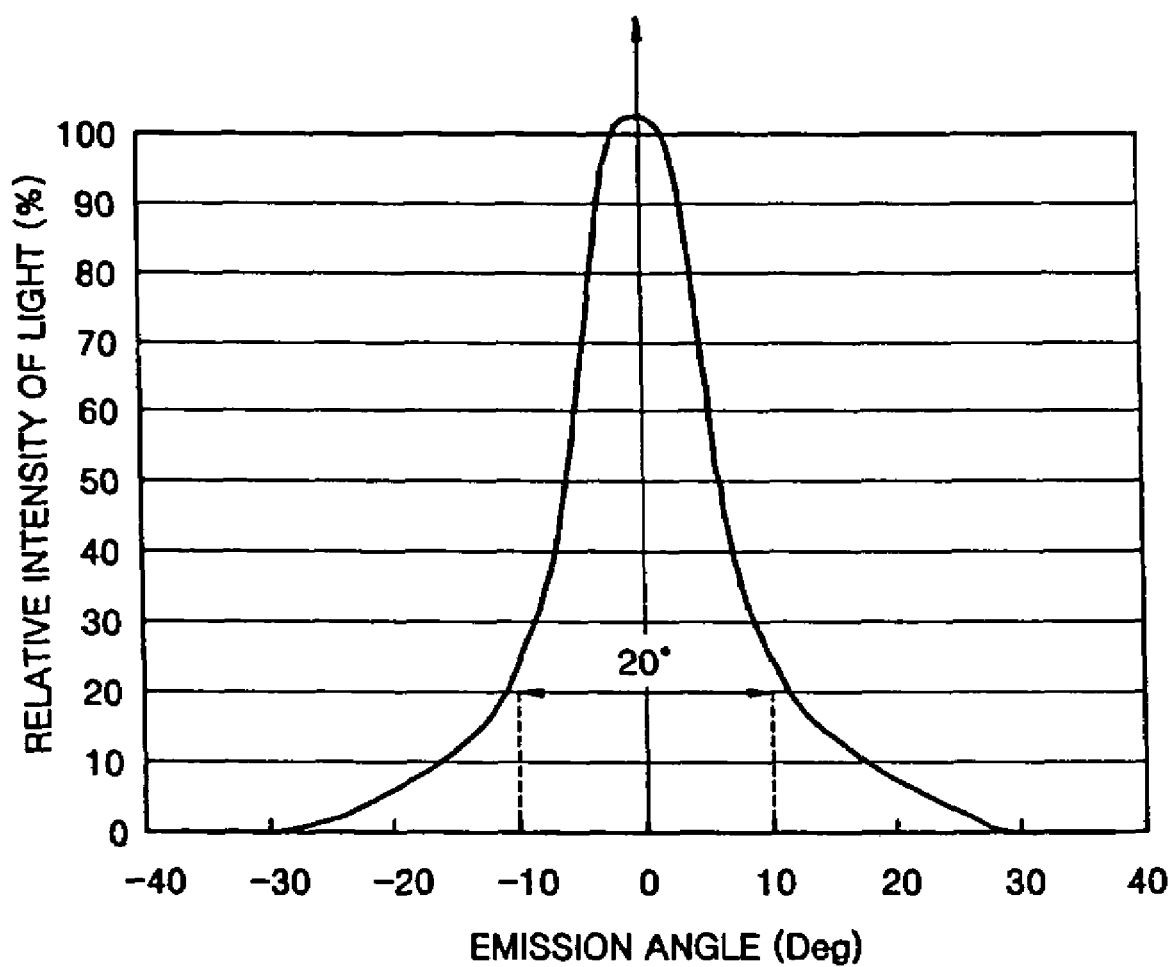
FIG. 9 is a graph showing the result of a simulation of the relative intensity with respect to an emission angle at which a light beam radiates from a side surface of the collimator of FIG. 6.

FIG. 9 is a graph showing the result of a simulation of the relative intensity of light with respect to an emission angle at which a light beam is emitted through the side aperture 121 of the collimator 120*c* of FIG. 6. As can be seen in FIG. 9, the relative light intensity is concentrated within the emission angle of ±20°. Therefore, a radiation angle at which a light beam radiates from the compact light source 110 can be changed into an angle at which the light beam is efficiently incident on an object, so as to improve light efficiency. Also, an illumination unit using the compact light source 110 does not require secondary optics. Thus, loss of light caused by the secondary optics can be prevented, and the illumination unit can be simplified.

Figure 10:
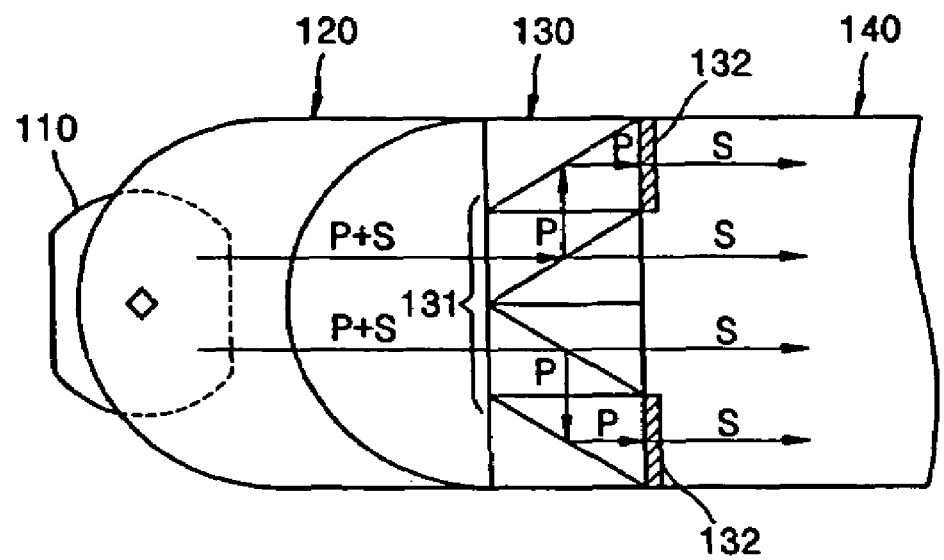
FIG. 10 is a horizontal cross-sectional view of portion H of FIG. 3.

FIG. 10 is a horizontal cross-sectional view of a portion H of FIG. 3. Referring to FIG. 10, the polarizer 130 polarizes a light beam radiating from the collimator 120 so as to have one of P and S polarization orientations. The polarizer 130 includes a plurality of PBSs 131 and a plurality of λ/2 plates 132. The PBSs 131 transmit S-polarized beams and reflect P-polarized beams. The reflected P-polarized beams are reflected from adjacent PBSs 131 and then are transformed into S-polarized beams via the λ/2 plates 132. In other words, the polarizer 130 transforms a light beam emitted from the collimator 120 into a light beam with the S polarization orientation so as to be incident on the integrator 140. The light beam may also be transformed into a light beam with the P polarization orientation via the PBSs 131.

Figure 11:
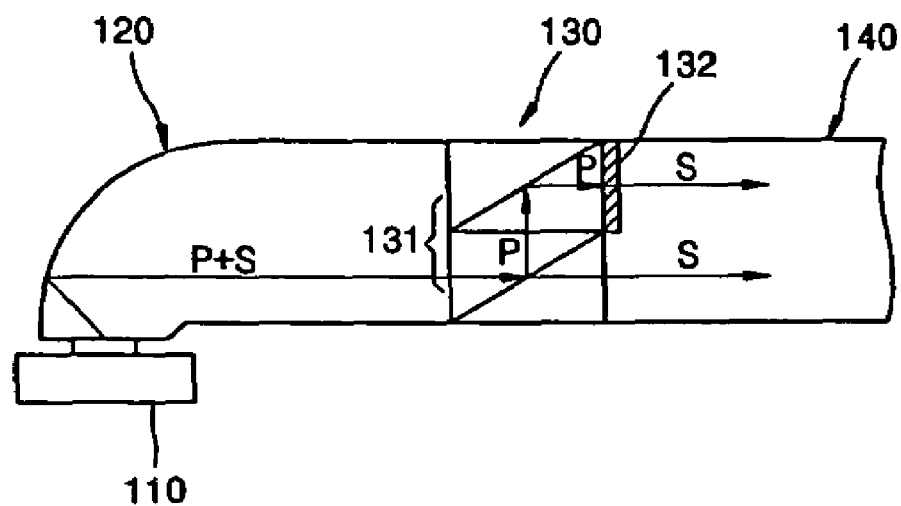
FIG. 11 is a vertical cross-sectional view of a polarizer, according to another embodiment of the present invention.
Figure 12:
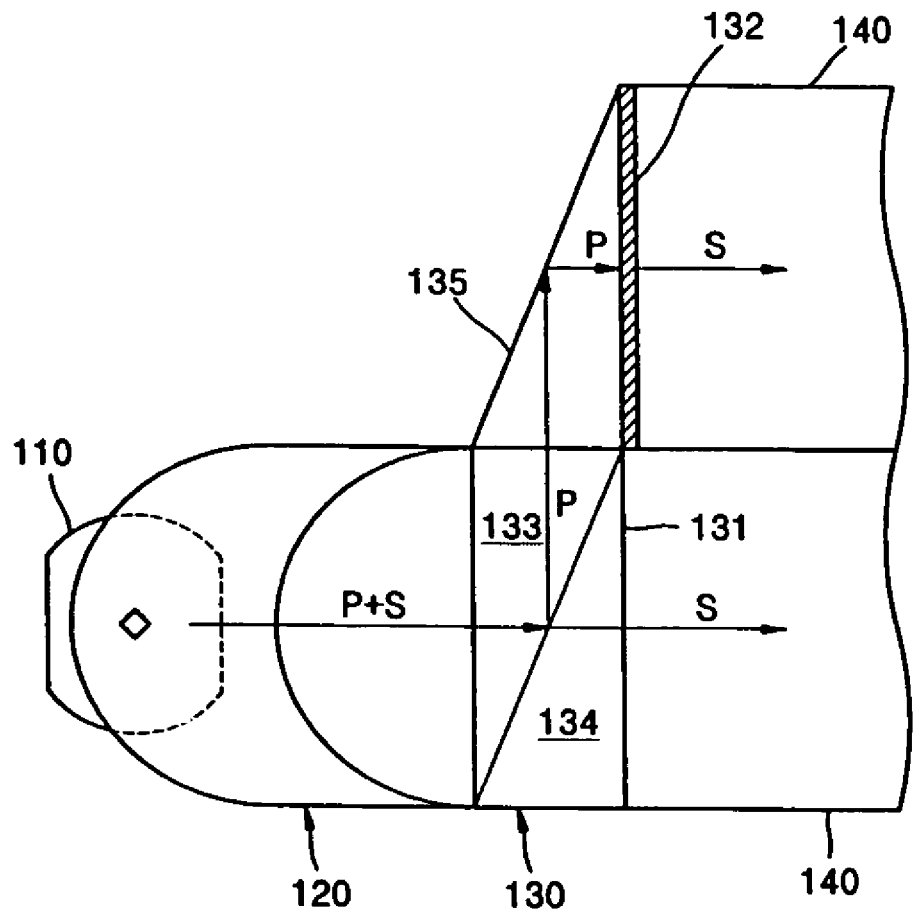
FIG. 12 is a horizontal cross-sectional view of a combination of a polarizer and an integrator, according to another embodiment of the present invention.

FIG. 11 is a vertical cross-sectional view of a polarizer, according to another embodiment of the present invention. Referring to FIG. 11, the polarizer 130 includes the PBSs 131 which are vertically arranged. FIG. 12 is a horizontal cross-sectional view of a combination of a polarizer and an integrator, according to an embodiment of the present invention. As shown in FIG. 12, a reflector 135 and a λ/2 plate 132 may be arranged in a reflection direction 133 along which the PBS 131 reflects light beams, and two integrators 140 may be respectively arranged in a transmission direction 134 along which the PBS 131 transmits the light beams and an emission direction along which the λ/2 plate 132 emits the light beams.

A reflective LCD or LCOS panel with the polarization characteristics is used as the reflective optical modulator 200. Thus, when non-polarized light beams are irradiated on the reflective LCD or LCOS panel, light efficiency may be deteriorated. This is because only light beams with a specific polarization orientation are used as effective light beams. In the present embodiment, the polarizer 130 can transform a non-polarized light beam radiating from the compact light source 110 into a polarized light beam to be efficiently modulated by the reflective LCD or LCOS panel, so as to improve light efficiency.

Figure 13:
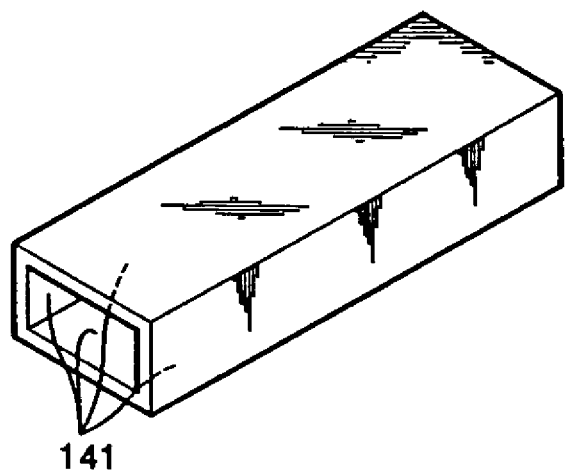
FIG. 13 is a perspective view of an integrator, according to another embodiment of the present invention.
Figure 14:
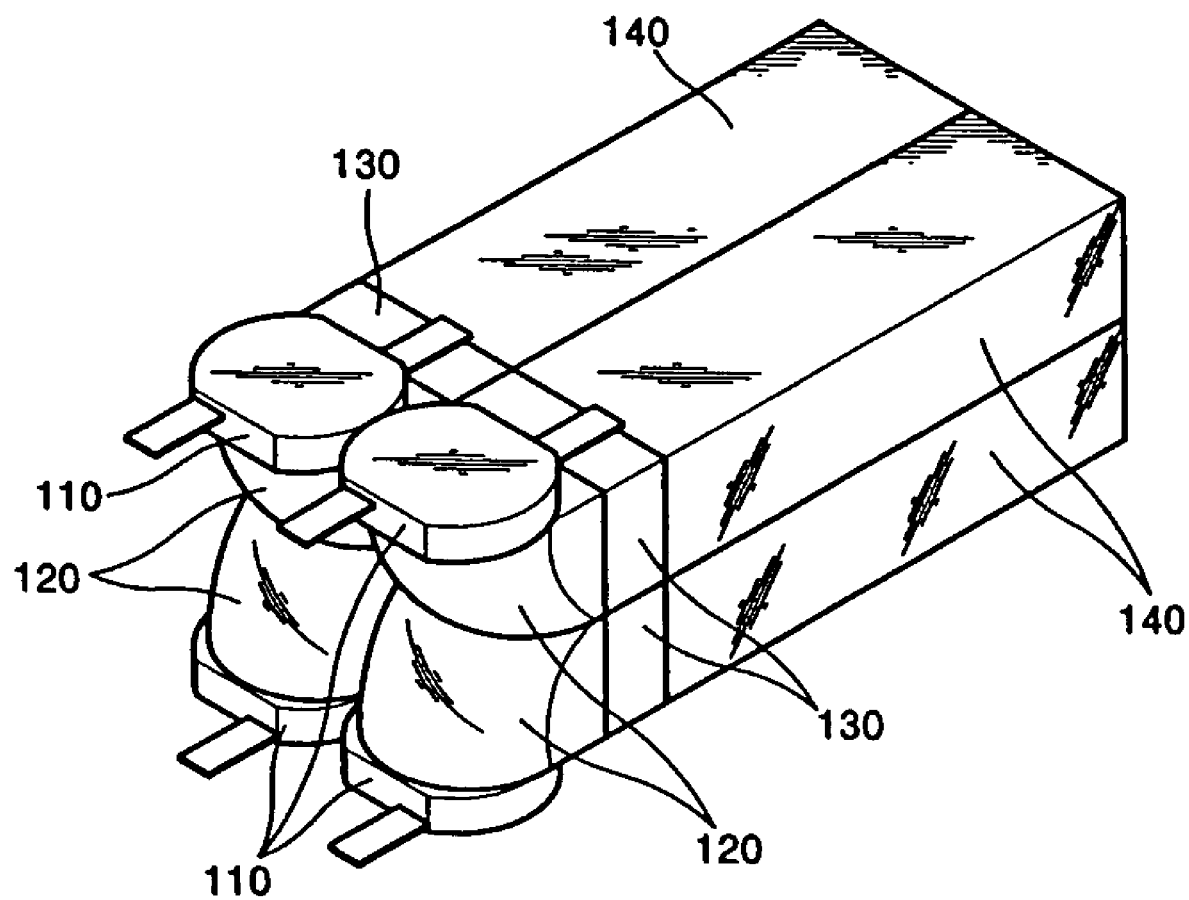
FIG. 14 is a perspective view of an illumination unit used with a projection display, according to another embodiment of the present invention.

Referring back to FIG. 3, a rectangular parallelepiped glass rod is used as the integrator 140. Light beams radiating through an end of the integrator 140 are sequentially reflected from the internal surface of the integrator 140 toward the other end of the integrator 140. In this process, the light beams are mixed to be emitted at a uniform intensity of light through the integrator 140. A rectangular parallelepiped light tunnel with an inner reflective surface 141, as shown in FIG. 13, may be used as the integrator 140.

In order to secure a sufficient amount of light, as shown in FIG. 4, each of the illumination units 100R, 100G, and 100B may include a plurality of compact light sources 110, a plurality of collimators 120, a plurality of polarizers 130, and a plurality of integrators 140. In a case where the collimator 120b or 120d shown in FIG. 5 or 7 is used, a larger number of compact light sources 110, polarizers 130, and integrators 140 can be arrayed in a predetermined space. As a result, brighter illumination light can be obtained.

Light beams emitted from the illumination units 100R, 100G, and 100B pass through the relay optics 160 (FIG. 2) and then are incident on the optical modulator 200. The relay optics 160 magnify or reduce the light beams emitted from the illumination units 100R, 100G, and 100B according to the aperture of the optical modulator 200, and then emit the light beams toward the optical modulator 200. The relay optics 160 include a plurality of relay lenses 161 and the optical path changer 162. The optical path changer 162 selectively transmits or reflects the light beams according to their wavelengths. In other words, the optical path changer 162 allows R, G, and B beams radiating from the illumination units 100R, 100G, and 100B, respectively, to be incident on the optical modulator 200 along the same optical path. The optical path changer 162 may be, for example, an X-prism shown in FIG. 2.

Reflectors 190 are installed in front of emission portions of the illumination units 100R and 100B. The reflectors 190 guide light beams radiating from the illumination units 100R and 100B toward the optical path changer 162. Each of the reflectors 190 and each of the integrators 140 may form a single body. For example, as marked with dotted lines in FIG. 2, the integrators 140 are curved, and incline planes on which the reflectors 190 are located are coated with a reflective material.

Figure 15:
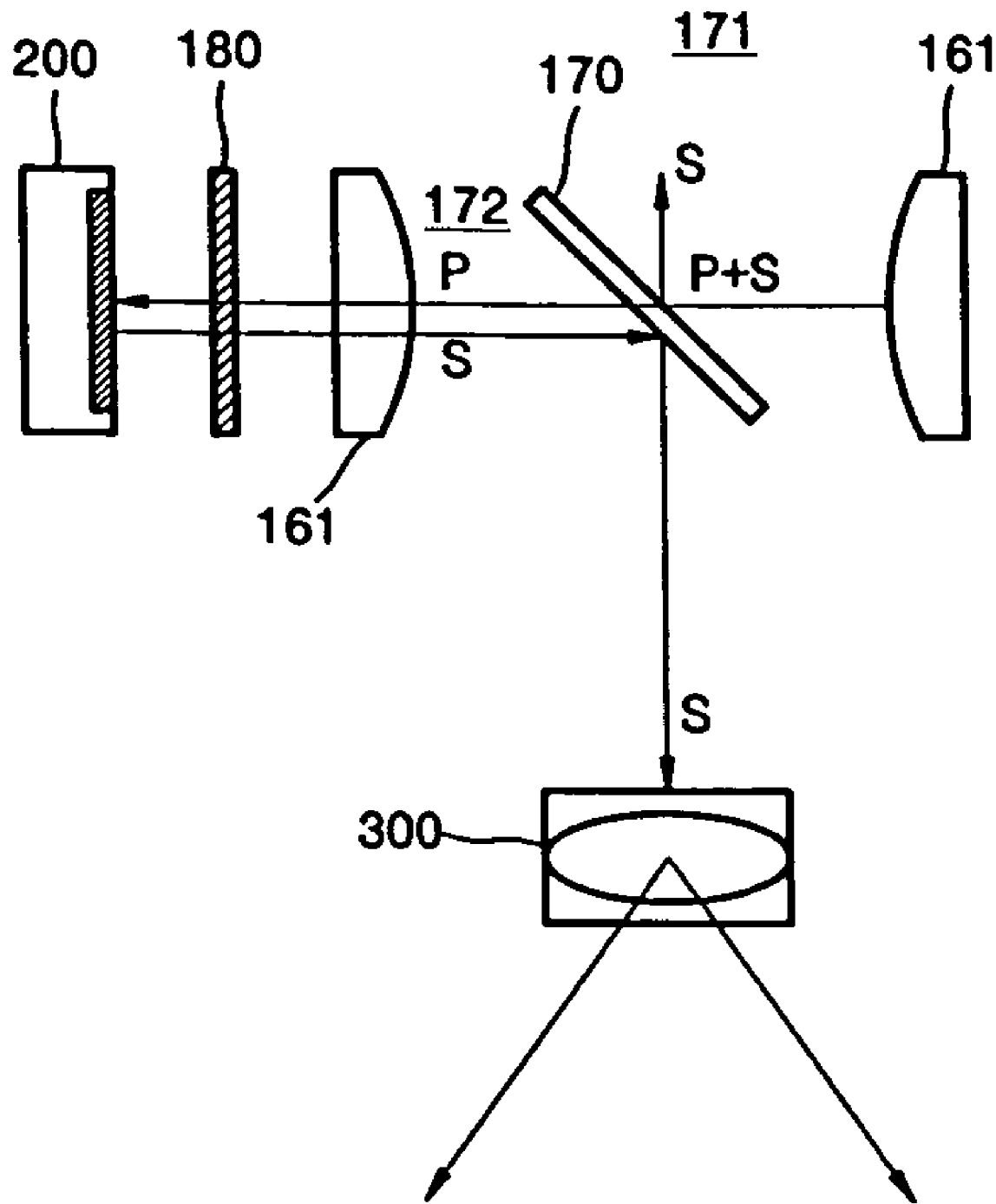
FIG. 15 is a detailed view of portion J of FIG. 2.

FIG. 15 is a detailed view of portion J of FIG. 2. Referring to FIG. 15, the optical modulator 200, the PBS 170, the λ/4 plate 180, and the projection optics 300 are shown. The PBS 170 transmits one of P and S waves and reflects the other one. In the present embodiment, since the light beams emitted from the illumination units 100R, 100G, and 100B are S-polarized, the PBS 170 transmits the S wave and reflects the P wave. The optical modulator 200 may be installed in either the reflection direction 171 or the transmission direction 172. In the present embodiment, the optical modulator 200 is installed in the transmission direction 172 of the polarizer 170. The λ/4 plate 180 is installed between the optical modulator 200 and the PBS 170.

A light beam radiating from the compact light source 110 is collimated by the collimator 120, S-polarized by the polarizer 130, and incident on the integrator 140. Next, the light beam is transformed by the integrator 140 to have a uniform light intensity, passes through the relay optics 160, and is incident on the PBS 170. Here, since the light beam is S-polarized, the light beam passes through the PBS 170 and the λ/4 plate 180 and is incident on the optical modulator 200. The optical modulator 200 modulates the light beam accordingly to image data and emits the modulated light beam. The modulated light beam passes through the λ/4 plate 180 and then is incident on the PBS 170. In this process, the modulated light beam is P-polarized. The light beam is reflected from the PBS 170 toward the projection optics 300. The projection optics 300 magnifies and projects the light beam on a screen (not shown).

In the above-described structure, when the illumination units 100R, 100G, and 100B sequentially operate, a color image can be projected on the screen. Also, unlike the conventional projection display using the metal halide lamp or the super-high voltage mercury lamp and the color wheel, the projection display of the present invention can be simplified and made compact.

Figure 16:
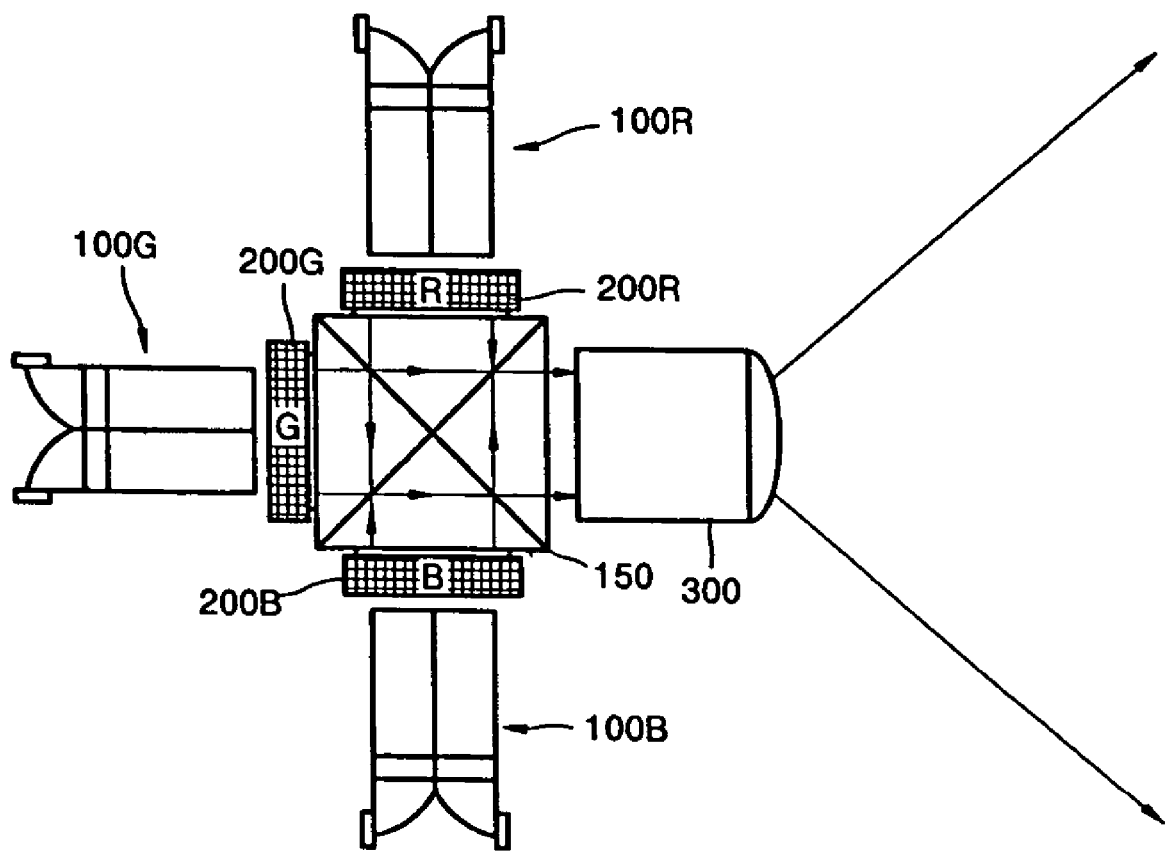
FIG. 16 is a view showing the structure of a projection display, according to another embodiment of the present invention.

FIG. 16 is a view showing the structure of a projection display, according to another embodiment of the present invention. In the present embodiment, the projection display is characterized by adopting a transmittable optical modulator. The same reference numerals as those of FIGS. 2 through 14 refer to the like elements. Thus, the repeated descriptions will be omitted.

Referring to FIG. 16, the projection display includes three illumination units 100R, 100G, and 100B, three transmittable optical modulators 200R, 200G, and 200B, a synthesizing prism 150, and projection optics 300. The synthesizing prism 150 combines R, G, and B beams modulated by the transmittable optical modulators 200R, 200G, and 200B, respectively, and radiates the combined beam on the projection optics 300. The synthesizing prism 150 may be the X-prism shown in FIG. 2. Although not shown in FIG. 16, relay optics including at least one relay lens may be installed between each of the illumination units 100R, 100G, and 100B and each of the transmittable optical modulators 200R, 200G, and 200B.

Transmittable LCD panels with the polarization characteristics may be used as the transmittable optical modulators 200R, 200G, and 200B. Thus, only light beams with a specific polarization orientation can be efficiently modulated by the transmittable LCD panels. Therefore, in a case where non-polarized light beams are irradiated on the transmittable LCD panels, light efficiency may be deteriorated. In the present embodiment, non-polarized light beams radiating from the compact light source 110 can be transformed into polarized light beams by the polarizer 130 to be efficiently modulated by the transmittable LCD panels.

As described above, a projection display according to the present invention can obtain the following advantages.

First, the projection display can include a collimator which efficiently collimates a light beam using reflective surfaces not a lens.

Second, since the projection display does not require secondary optics, loss of light caused by the secondary optics can be prevented. As a result, an illumination unit can be simplified and made compact.

Third, since the projection display can use a compact light source such as an LED, the projection display can have a long life span.

Fourth, the projection display can include a polarizer so as to improve light efficiency.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A projection display comprising three illumination units to emit red, green, and blue beams, at least one optical modulator to modulate the red, green, and blue beams to be suitable for image data, and projection optics to magnify and project the light beams emitted from the at least one optical modulator, each of the illumination units comprising:
    a collimator comprising a parabolic first reflective surface;
    a compact light source located at a focal point of the first reflective surface;
    a polarizer that transforms a light beam emitted from the collimator into a P- or S-polarized beam; and
    an integrator that transforms the light beam emitted from the polarizer to be emitted at a uniform intensity of light.

2. The projection display of claim 1, wherein the compact light source is arrayed so that its optical axis is perpendicular to a principal axis of the first reflective surface.

3. The projection display of claim 2, wherein the collimator further comprises a second reflective surface which faces the first reflective surface and which comprises an optical window through which a light beam radiates from the compact light source.

4. The projection display of claim 3, wherein in the collimator further comprises a third reflective surface which is slantingly formed at the edge of the optical window and reflects a light beam radiating at a smaller angle than an aperture angle toward the first reflective surface.

5. The projection display of claim 4, wherein:
    the collimator is formed of a transparent body,
    the first reflective surface of the collimator is coated with a reflective material so as to reflect the light beam radiating from the at least one optical modulator,
    the second reflective surface of the collimator is coated with a reflective material except at the optical window, and
    the third reflective surface of the collimator is coated with a reflective material.

6. The projection display of claim 1, wherein the collimator further comprises a second reflective surface which faces the first reflective surface and which comprises an optical window through which a light beam radiates from the compact light source, the second reflective surface inclining with respect to the principal axis of the first reflective surface at a predetermined incidence angle and the compact light source being arrayed so that its optical axis inclines with respect to the principal axis at the same incidence angle as the predetermined incidence angle of second reflective surface.

7. The projection display of claim 6, wherein the collimator further comprises a third reflective surface which is slantingly formed at the edge of the optical window and reflects a light beam radiating at a smaller angle than an aperture angle toward the first reflective surface.

8. The projection display of claim 7, wherein:
    the collimator is formed of a transparent body,
    the first reflective surface of the collimator is coated with a reflective material so as to reflect the light beam radiating from the at least one optical modulator,
    the second reflective surface of the collimator is coated with a reflective material except at the optical window, and
    the third reflective surface of the collimator is coated with a reflective material.

9. The projection display of claim 1, wherein the integrator comprises a rectangular parallelepiped glass rod.

10. The projection display of claim 1, wherein the integrator comprises a rectangular parallelepiped light tunnel with an inner reflective surface.

11. The projection display of claim 1, wherein the polarizer comprises:
    a polarizing beam splitter that transmits one of P and S waves and reflects the other one; and
    a $\lambda/2$ plate that transforms one of the transmitted and reflected wave beams so as to have a different polarization orientation.

12. The projection display of claim 1, wherein the optical modulator is a reflective optical modulator which sequentially modulates the red, green, and blue beams emitted from the three illumination units.

13. The projection display of claim 12, wherein a $\lambda/4$ plate and a polarizing beam splitter are sequentially installed in front of the reflective optical modulator, the polarizing beam splitter and the $\lambda/4$ plate transmitting the red, green, and blue beams radiating from the illumination units, the reflective optical modulator modulating the red, green and blue beams, the $\lambda/4$ plate re-transmitting the red, green, and blue beams, and the polarizing beam splitter reflecting the red, green, and blue beams toward the projection optics.

14. The projection display of claim 1, wherein the at least one optical modulator comprises three transmittable optical modulators that modulate the red, green, and blue beams radiating from the illumination units, respectively, and the projection display further comprises a synthesizing prism that combines the red, green, and blue beams emitted from the transmittable optical modulators and irradiates the combined beam on the projection optics.

15. A projection display comprising three illumination units to emit red, green, and blue beams, an optical modulator to modulate the red, green, and blue beams accordingly to image data, and projection optics to magnify and project the light beams emitted from the optical modulator, each of the illumination units comprising:

a collimator that comprises a parabolic first reflective surface and a second reflective surface which faces the first reflective surface and which comprises an optical window through which light beams radiate in the vicinity of a focal point of the first reflective surface;

a compact light source located at the focal point of the first reflective surface;

a polarizer that transforms a light beam emitted from the collimator into a P- or S-polarized beam; and a rectangular parallelepiped glass rod that transforms the polarized beam emitted from the polarizer to be emitted at a uniform intensity of light.

16. The projection display of claim 15, wherein the compact light source is arrayed so that its optical axis is perpendicular to a principal axis of the first reflective surface.

17. The projection display of claim 15, wherein the second reflective surface inclines with respect to the principal axis of the first reflective surface at a predetermined incidence angle and the compact light source is arrayed so that its optical axis inclines with respect to the principal axis at the same incidence angle as the predetermined incidence angle of second reflective surface.

18. The projection display of claim 15, wherein the collimator further comprises a third reflective surface which is slantingly formed at the edge of the optical window and reflects a light beam radiating at a smaller angle than an aperture angle toward the first reflective surface.

19. The projection display of claim 15, wherein the optical modulator is a reflective optical modulator which sequentially modulates the red, green, and blue beams emitted from the three illumination units.

20. The projection display of claim 19, wherein:

a λ/4 plate and a polarizing beam splitter are sequentially installed in front of the reflective optical modulator, the polarizing beam splitter and the λ/4 plate transmit the red, green, and blue beams radiating from the illumination units, the reflective optical modulator modulates the red, green, and blue beams, the λ/4 plate re-transmits the red, green, and blue beams, and the polarizing beam splitter reflects the red, green, and blue beams toward the projection optics.

21. The projection display of claim 15, wherein the optical modulator comprises three transmittable optical modulators that modulate the red, green, and blue beams radiating from the illumination units, respectively, and the projection display further comprises a synthesizing prism that combines the red, green, and blue beams emitted from the transmittable optical modulators and irradiates the combined beam on the projection optics.

22. An illumination unit having a light source and to be used with a projection display, comprising:

a collimator comprising a parabolic first reflective surface;

a compact light source located at a focal point of the first reflective surface;

a polarizer that transforms a light beam emitted from the collimator into a P and S polarized beam; and an integrator that transforms a light beam emitted from the polarizer to be emitted at a uniform intensity of light.

23. The illumination unit of claim 22, wherein the compact light source is arrayed so that its optical axis is perpendicular to a principal axis of the first reflective surface.

24. The illumination unit of claim 22, wherein the collimator further comprises a second reflective surface which faces the first reflective surface and which includes an optical window through which a light beam radiates from the compact light source.

25. The illumination unit of claim 24, wherein the second reflective surface inclines with respect to the principal axis of the first reflective surface at a predetermined incidence angle the compact light source is arrayed so that its optical axis inclines with respect to the principle axis at the same incidence angle as the predetermined incidence angle of the second reflective surface.

26. The illumination unit of claim 24, wherein the collimator further comprises a third reflective surface which is slantingly formed at the edge of the optical window and reflects a light beam radiating at a smaller angle than an aperture angle toward the first reflective surface.

* * * * *